United States Patent [19]
van Werkhoven et al.

[11] 4,087,724
[45] May 2, 1978

[54] FLASH ARRAY PROVIDED WITH AT LEAST TWO COMBUSTION FLASH LAMPS

[75] Inventors: Jan van Werkhoven, Eindhoven; Bauke Jacob Roelevink, Terneuzen, both of Netherlands

[73] Assignee: U.S. Philips Corporation, New York, N.Y.

[21] Appl. No.: 683,537

[22] Filed: May 5, 1976

[30] Foreign Application Priority Data

Jun. 5, 1975 Netherlands .......................... 7506653

[51] Int. Cl.² .......................... H05B 41/34; F21K 5/02
[52] U.S. Cl. ..................... 315/323; 315/232; 431/95 A
[58] Field of Search ............... 315/241 P, 252, 312, 315/323; 354/132; 431/95 A

[56] References Cited
U.S. PATENT DOCUMENTS

| 3,617,763 | 11/1971 | Laskowski ................... 431/95 A X |
| 3,692,995 | 9/1972 | Wagner ....................... 431/95 A X |
| 3,726,631 | 4/1973 | deGraaf et al. ................... 431/95 |

Primary Examiner—Eugene R. LaRoche
Attorney, Agent, or Firm—Frank R. Trifari; Robert S. Smith

[57] ABSTRACT

A flash array provided with a number of high voltage combustion flash lamps which are ignited by means of a piezo element. The flashing of two lamps at the same time is prevented by means of melting strips.

According to the invention the igniting pulse for a second lamp of the device is passed on via a capacitive circuit element which is formed by the flashed first lamp or a separate capacitor. By using such a capacitor circuit element instead of an ohmic resistance undesired loss of heat is avoided.

9 Claims, 6 Drawing Figures

FLASH ARRAY PROVIDED WITH AT LEAST TWO COMBUSTION FLASH LAMPS

The invention relates to a flash array provided with at least two electrical input terminals, which are intended for connection to a voltage source which supplies a pulse-shaped voltage, and with at least two combustion flash lamps, as well as with means for igniting those lamps in succession, for the purpose of which a first break contact is added to the first lamp which breaks when that lamp is flashed, the second lamp and the first make contact being located in parallel branches.

A known flash array of the above type is, for example, described in United Kingdom patent specification No. 1,330,906 which describes both a flash array having combustion flash lamps connected in series and a flash array having combustion flash lamps which are connected in parallel. An advantage of that known flash array is that if a lamp fails to ignite for some reason or another it is yet possible to switch over to a next lamp namely by scratching such a break contact of the device through either with a fingernail or by a sharp object.

In that known flash array in which the lamps are connected in series an already flashed lamp should be very low-ohmic or that flashed lamp must be shunted by an ohmic resistance.

In the known flash array having lamps which are connected in parallel, the resistance of the parallel branch which comprises the lamp to be flashed should be smaller than of a parallel branch which comprises a bulb which must be flashed thereafter. If not, the relevant lamp is not flashed. In that known device the through-connection is inter alia effected by including ohmic resistances in the further parallel branches.

Said ohmic resistances in the two embodiments of the flash array according to the United Kingdom patent specification result in losses in the form of undesired heat generation. This is a disadvantage. Furthermore, a condition that a flashed lamp must be low-ohmic imposes special requirements on the manufacture of that lamp. This is also a disadvantage.

It is an object of the invention to provide a reliable, through-connecting flash array which is free of loss of heat, while no special requirements for the resistance are imposed on the flashed lamp, and in which the said advantage of a break contact is maintained.

The invention is based on the concept that if the flash lamps are high voltage combustion flash lamps, the electrical ignition pulse for such a lamp can be passed on through a capacitive circuit element, namely because the current strength is comparatively low with these high voltage lamps. By means of this capacitive circuit element a reliable through-connecting flash array can then be obtained which is free of loss of heat.

The flash arrays according to the invention can be classified in two groups, namely flash arrays having flash lamps which are connected in series and flash arrays having flash lamps which are connected in parallel.

A flash array according to the invention, in accordance with the first group provided with at least two electrical input terminals, which are intended for connection to a voltage source which supplies a pulse-shaped voltage, and with at least two combustion flash lamps which are connected in series, as well as with means for igniting those lamps in succession, for which purpose a first break contact is added to the first lamp which contact breaks when that lamp is flashed and the second lamp and the first break contact being located in parallel branches, is characterized in that the lamps are high voltage combustion flash lamps and that, at least after the flashing of the first of the two lamps, the input terminals are interconnected by a series circuit of a mainly capacitive circuit element and the parallel branches.

A flash array according to the invention in accordance with the second group, provided with at least two electrical input terminals, which are intended for connection to a voltage source which supplies a pulse-shaped voltage, and with at least two combustion flash lamps which are interconnected in parallel between the input terminals, as well as with means for igniting those lamps in succession, for which purpose a first break contact is added to the first lamp which contact breaks when that lamp is flashed, the second lamp and the first break contact being located in parallel branches, is characterized in that the lamps are high voltage combustion flash lamps and that the input terminals are interconnected by means of a series circuit of a mainly capacitive circuit element and the parallel branches which comprise the second lamp and the first break contact, and in that the part of this series circuit which comprises both the mainly capacitive circuit element and the second lamp is shunted by a branch which comprises the first lamp.

An advantage of the two groups of flash arrays is that no separate ohmic resistances are required for through-connection and furthermore that an already flashed lamp need not be low ohmic.

To explain the problems with flash arrays the following should be noted. As a rule four requirements must be satisfied with flash arrays, namely:

(1) the circuit of the second lamp shall not disturb the ignition of the first lamp, (2) the flashing of the first lamp may not result in the second lamp flashing immediately; i.e., no double flashes.

(3) after the first lamp has flashed the second lamp must be in a circuit which is ready for flashing.

(4) the circuit of the already flashed first lamp shall not disturb the ignition of the second lamp.

The above-mentioned points (2) and (3) are realized in a flash array according to the invention by means of the first break contact which is constructed, for example, as a radiation-sensitive melting strip. At first this strip is a short-circuit of the second lamp. When the first lamp flashes this strip is melted so that the short-circuit of the second lamp is then eliminated.

As regards point no. 1 of the four requirements mentioned above, the following should be noted. With a series circuit of flash lamps the ignition current for the first lamp flows through the break contact added thereto. Then the second lamp does not interfere in the ignition of the first lamp.

With a parallel circuit of flash lamps in a circuit according to the invention the capacitor ensures that the impedance of the branch of the second lamp is not too small. For with an impedance which is too small the igniting pulse in the branch of the first lamp would be too small to ignite that lamp.

As regards the above-mentioned fourth point it should be noted that with a series circuit of lamps the flashed lamp may form the mainly capacitive circuit element, or that, for example, this circuit element may be constituted by means of a separate capacitor which is connected in parallel to the first lamp. So ignition of the second lamp is effected through that capacitance.

With a parallel connection of the flash lamps a second radiation-sensitive break contact is preferably added to a lamp, whereby this contact is in series with that lamp. When this contact is broken — when the first lamp is flashed — this lamp is disconnected from the circuit. This flashed first lamp can then in no way interfere with the ignition of a second or next lamp. However, it is conceivable that the requirement in point four is also satisfied in another manner, for example by providing the flash array with a mechanical ejection mechanism which removes a flashed lamp from the circuit.

A flash array according to the invention is, for example, used for photographical purposes. The array is then arranged on or near a photocamera, a command for flashing a high voltage combustion flash lamp from the array being given when the shutter of the camera is opened.

In a preferred embodiment of a flash array in accordance with the first group, that is to say in the case of flash lamps which are connected in series, the mainly capacitive circuit element consists at least of the ignited first lamp.

An advantage of this preferred embodiment is that only very few circuit elements will do. Use is made of the fact that an already flashed high voltage combustion flash lamp often has a capacitance value which is between approximately 0.2 pF and approximately 20 pF. This capacitance value can be used to pass on an igniting pulse for the second lamp.

The mainly capacitive circuit element might, for example, also consist of a high voltage combustion flash lamp already ignited, which, after flashing of the first lamp, is connected in parallel with this lamp.

In a further preferred embodiment of a flash array according to the invention, for a series connection of flash lamps, the mainly capacitive circuit element consists of a capacitor which shunts the branch which comprises the first lamp.

An advantage of this preferred embodiment is that, if the lamp which has already been flashed would have a capacitance value which is too small, the second lamp can — via the capacitor — still be properly ignited. A further advantage is that, if the flash array should contain a large number of lamps, the total capacitive inpedance in the circuit for igniting subsequent lamps can be not too large, so that also for those further lamps a sufficiently large ignition pulse remains available.

A further improved flash array according to that preferred embodiment of the invention is therefore provided with $n$ high voltage combustion flash lamps, where $n$ is larger than 2 and in which these lamps are in series, and is characterized in that it applies for each of at least $(n-2)$ of those lamps that it is included in a separate series circuit which comprises the break contact added to that lamp and the added capacitor, the break contact shunting the series circuit of the next lamp to be flashed and the break contact added to that next lamp, whilst the capacitor invariably constitutes a shunt of at least the preceding lamp.

An advantage of this further preferred embodiment is that it results in a particularly simple and reliable flash array.

In a following preferred embodiment of a flash array according to the invention, having lamps which are connected in parallel, the mainly capacitive circuit element consists of a capacitor.

An advantage of this preferred embodiment is that it is now possible to prevent in a reliable manner that if the first lamp must be ignited, the impedance of the circuit which contains the second lamp is low. The impedance of that circuit can namely be adjusted to a sufficiently high value by means of the capacitor.

In a further improvement of the last-mentioned preferred embodiment the shunting branch which comprises the first lamp comprises a second break contact which opens the circuit when that first lamp is flahsed.

An advantage of this further improvement is that the uncertain behaviour of the high voltage combustion flash lamp which can also assume a low resistance value after flashing and which, in that case, might, in a parallel circuit of bulbs, act in a disturbing manner on the ignition of a next lamp is now eliminated, namely because this lamp is disconnected by means of the second break contact. Also this break contact may have been constructed as a radiation-sensitive melting strip.

In a still further improvement of the last-mentioned preferred embodiment the first break contact which opens the circuit when the first lamp is flashed, is constructed, together with the second break contact, as a combined-provided with three electrical terminals radiation-sensitive melting strip.

An advantage of this improvement is that it is possible to realize the reliable through-connection of the flash lamps with an extremely simple arrangement.

In a further embodiment of a flash array according to the invention, having lamps which are connected in parallel, a series conductor is connected to each of the two input terminals and $n$ high voltage combustion flash lamps are interconnected in parallel between those series conductors, where $n$ is larger than 2 and whereby it applies for each of at least $(n-2)$ of those lamps that this lamp is part of a separate series circuit which is connected between the two series conductors and which, besides that lamp also comprises its capacitor and second break contact, while a part of the series circuit which comprises the lamp and which is free of the capacitor, is shunted by the first break contact of the preceding lamp.

An advantage of this preferred embodiment is that this results in a simple, very reliable flash array.

The pulse-shaped voltage of the voltage source to which the electrical input terminals of the flash array are connected may, for example, be supplied by means of a pulse transformer.

In a flash unit provided with a flash array according to the invention this unit comprises a voltage source which is constructed as a piezo element and the input terminals of the flash array are connected, in the operating condition, to this voltage source.

An advantage of such a preferred embodiment is that the voltage source may be very simple. This voltage source is, for example, formed by a piezo element with operating mechanism which is located in the photocamera or in an adaptor between the photo camera and the flash array.

The invention will be further explained with reference to a drawing in which.

Figure 1:
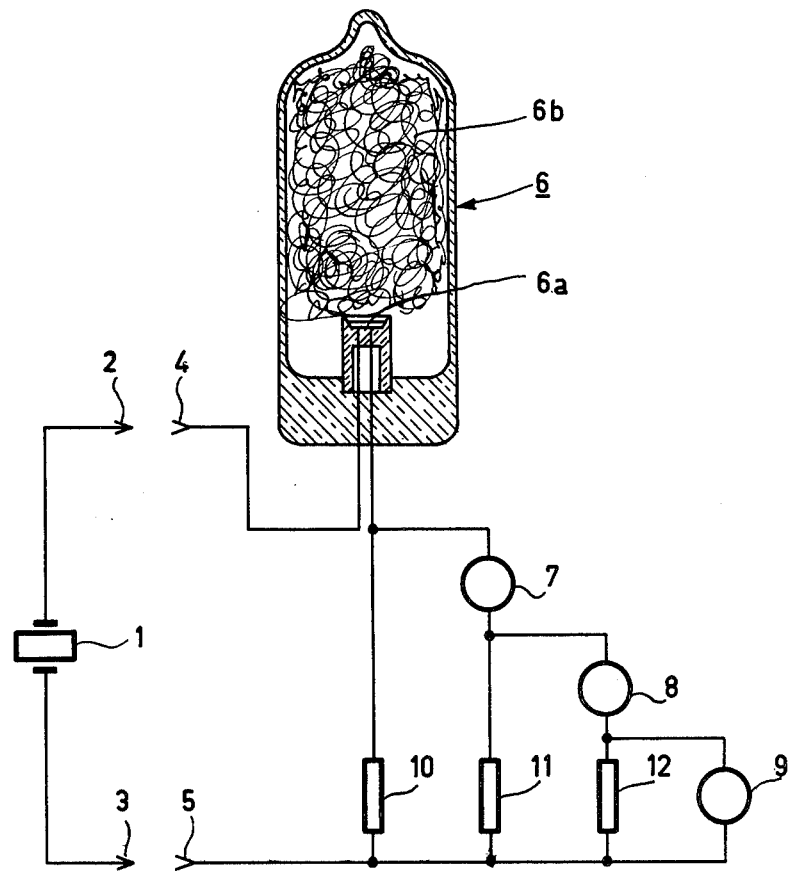
FIG. 1 shows a first flash array according to the invention as well as a voltage source for it.

In FIG. 1 a piezo element 1 is provided with output terminals 2 and 3. Furthermore a flash array is present having input terminals 4 and 5 respectively. Terminal 4 is intended for connection to terminal 2 and terminal 5 is intended for connection to terminal 3. The flash array comprises four high voltage combustion flash lamps which are designated by 6, 7, 8, 9. The lamp 6 is shown in longitudinal section. The other lamps are represented symbolically by means of circles. A radiation-sensitive break contact 10 or fusable strip or melting strip is connected between the lamp 6 and the terminal 5. When the lamp 6 is flashed this strip fuses i.e., melts and interrupts electrical continuity therein. A similar strip 11 is added to lamp 7. Strip 12 cooperates with lamp 8.

The arrangement of FIG. 1 operates as follows. When the input terminals 4, 5 are connected to the output terminals 2, 3 of the element 1 and the element 1 is operated for the first time a voltage pulse is produced which flows through the circuit which comprises elements 4, 6, 10, 5. This pulse ignites the bulb 6. When this lamp 6 flashes, light is emitted and at the same time the melting or fusable strip 10 fuses owing to the heat radiation of the lamp. The short circuit of the remaining part of the circuit which was originally effected by the strip 10 is now eliminated. The lamp 6 now has a capacitance value of between approximately 0.5 pF and 20pF. If now the piezo element is operated for the second time a high voltage pulse is produced in the circuit 4, 6, 7, 11, 5. Thereafter lamp 7 ignites. In its turn the melting strip 11 fuses due to the heat developed by the lamp 7. The short circuit of the lamp 8 which is thereby removed now connects the lamp 8 in the circuit ready for flashing. With a subsequent pulse the lamp 8 will ignite and finally, at subsequent pulse, the lamp 9. The circuit described is based on the property that the already flashed lamps have a capacitance value which is suitable for passing the high voltage pulse for the next lamp to be ignited.

Figure 2:
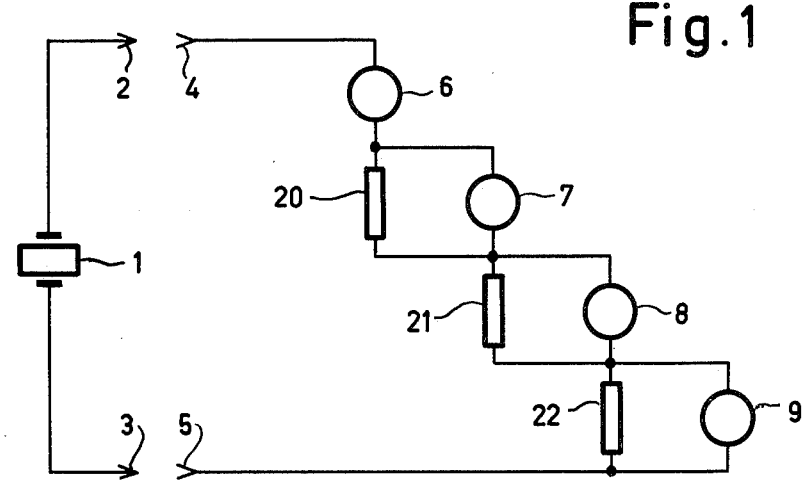
FIG. 2 shows a second flash array according to the invention as well as a voltage source for it.

FIG. 2 shows a circuit which, in broad outlines, corresponds with that of FIG. 1. However, instead of the strips 10, 11 and 12 now strips 20, 21 and 22 are present, while each of the strips 20, 21 and 22 only constitutes a shunt of the next lamp exclusively. So the strip 20 — which reacts to the flashing of the lamp 6 — only shunts the lamp 7. The strip 21 shunts lamp 8 and the strip 22 shunts lamp 9. The strip 21 reacts to the flashing of the lamp 7 and the strip 22 reacts to the flashing of the lamp 8. This results in that, for example, when the lamp 6 is flashed the high voltage pulse is first produced in the circuit 4, 6, 20, 21, 22, 5. But the operation of this array is further similar to that of FIG. 1. As before an already flashed lamp has a capacitance value of between approximately 0.5 pF and 20 pF. In the circuits of the FIGS. 1 and 2 the slope of the pulse realized by the piezo element 1 is approximately 1000 Volts per micro sec. Prior to the ignition of a lamp the ohmic value thereof is approximately $10^9$ ohm and the capacitance value approximately 0.5pF. An example of a flash lamp for the circuits of FIGS. 1 and 2 is shown in FIG. 1, see reference numeral 6. The outside diameter of the lamp 6 is approximately 7mm. The distance between the poles in the lamp is approximately 0.8 mm. A combustible is present at 6a. Reference 6b represents shredded metal.

Figure 3:
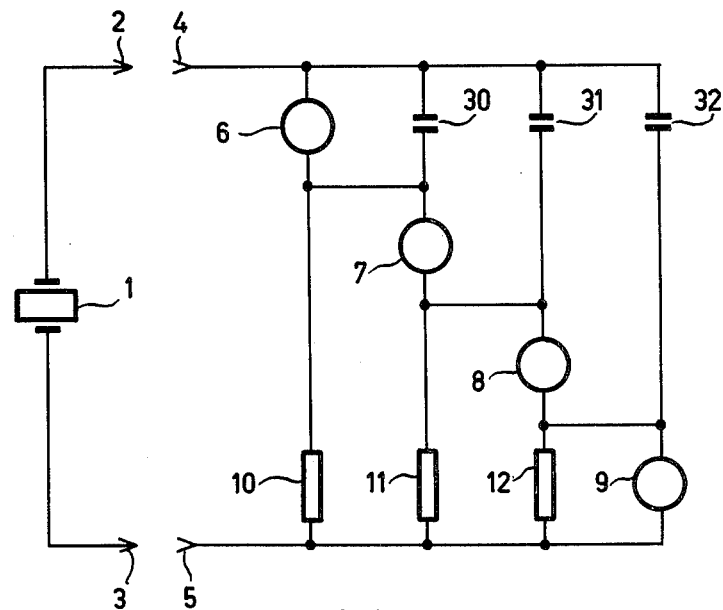
FIG. 3 shows a third flash array according to the invention as well as a voltage source for it.

FIG. 3 shows a variant of FIG. 1 in which the lamp 6 is shunted by a capacitor 30. The series arrangement of the capacitor 30 and the lamp 7 is shunted by a capacitor 31. Furthermore, the series arrangement of the capacitor 31 and the lamp 8 is shunted by a capacitor 32.

An advantage of this circuit is that if, for example, bulb 6 would assume a very low capacitance value after flashing and its ohmic value would be rather high, the ignition pulse for the lamp 7 can yet reach this lamp, namely through the capacitor 30 which is connected in parallel with the lamp 6. The same applies for the flashed condition of the lamp 7 etc. for which the capacitor 31 lends assistance.

A further advantage of the device is that, also if the lamps 6, 7 and 8 after flashing would assume a good capacitance value — in the range of between 0.5pF and 20pF — the ignition pulse for the lamp 9 is not relatively small. The total capacitive impedance in the circuit of the lamp 9 is namely reduced to such an extent by the added capacitors 30, 31 and 32 that also this lamp 9 can be ignited in a sufficiently reliable manner. The capacitance value of the capacitors 30, 31 and 32 was 7pF, 5pF and 5pF respectively.

If a very intensive illumination would be required a strip—for example 10—could be scratched through beforehand so that then the lamps 6 and 7 ignite simultaneously.

It should be furthermore noted that the circuit of FIG. 3 when ohmic resistors would be used instead of the capacitors 30, etc. (so a circuit not in accordance with the invention) would substantially not result in a flash array which would actually work because the requirements to be imposed on those resistors, before and after flashing of such a high voltage combustion flash lamp, are often conflicting.

The FIGS. 1, 2 and 3 described are examples of flash arrays according to the invention in accordance with the first group, namely the group of combustion flash lamps which are connected in series. The FIGS. 4 to 6 inclusive which follow hereafter describe flash arrays according to the invention having combustion flash lamps which are connected in parallel.

Figure 4:
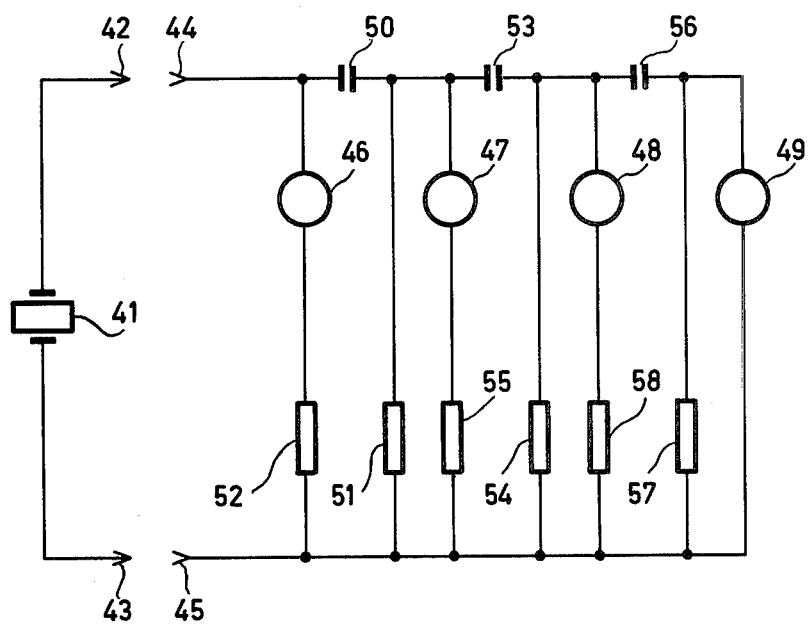
FIG. 4 shows a fourth flash array according to the invention as well as a voltage source for it.

In FIG. 4 reference numeral 41 designates a piezo-element. This element is provided with output terminals 42 and 43. Reference numeral 44 designates an input terminal of a flash array. Reference numeral 45 is another input terminal of this flash array. Terminal 44 is intended for connection to a terminal 42. Furthermore terminal 45 is intended for connection to terminal 43. Reference numerals 46, 47, 48 and 49 designate high voltage combustion flash lamps. The lamp 46 is connected to the terminal 44. A capacitor 50 is also connected to this terminal. Connected to the other electrode of the capacitor 50 there is a first melting strip 51 whose other side is connected to the terminal 45. Reference numeral 52 designates a second melting strip which is connected between the lamp 46 and the terminal 45. The melting strips 51 and 52 fuse when the lamp 46 flashes. The circuit repeats itself parallel to the strip 51, a combination of lamp 47 capacitor 53 and a melting strip 54 being present, whilst the side of the capacitor 53 which faces away from a melting strip 54 is again connected to the terminal 45. Also in this case a melting strip 55 is also in series with the lamp 47. The circuit repeats itself in parallel with a melting strip 54, this circuit comprising a capacitor 56 and melting strips 57 and 58. The last strip 57 is shunted by the lamp 49.

This circuit operates as follows. After the terminal 44 has been connected to 42, and 45 to 43, the piezo element 41 is operated for the first time. This results in a high voltage pulse in the circuit 44, 46, 52, 45. The impedances of the circuits of the other lamps have, namely, a much higher impedance than that of the circuit of lamp 46 owing to the capacitors. The designated pulse causes the lamp 46 to ignite. Besides the fact that light is emitted, the heat radiation of that lamp causes the strips 51 and 52 to fuse. This results in that — owing to fusing of the strips 51 — the short circuit across the next lamp 47 is eliminated and that the lamp 46 itself owing to the fusion of strip 52 — is removed from the circuit. If now the piezo element 41 is operated for the second time a pulse is produced which travels through the terminal 44, the capacitor 50, the lamp 47, the strip 55 to the terminal 45. The lamp 47 ignites thereafter. In its turn the flashing causes the strips 54 and 55 to fuse, which results on the one hand in that the original short circuit across the lamp 48 is eliminated and furthermore that, owing to the fusion of the strip 55, the lamp 47 is removed from the circuit etc. Thereafter the lamp 48 is ignited and when the piezo element 41 is operated for the fourth time, the lamp 49. In a practical embodiment the capacitance value of each of the lamps 46, 47, 48, 49 prior to ignition is approximately 0.5pF. The capacitance value of the capacitor 50 is approximately 20pF, that of the capacitor 53 approximately 14pF and that of capacitor 56 approximately 2pF.

Figure 5:
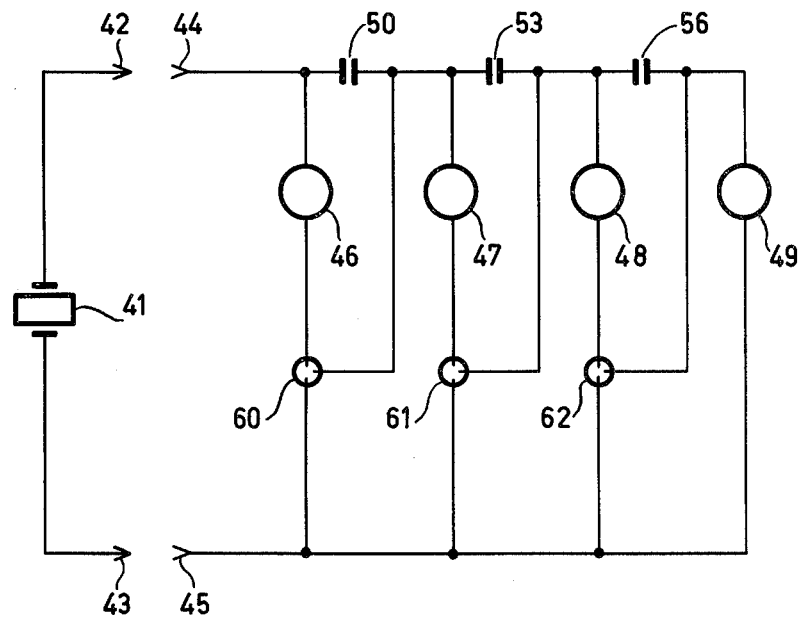
FIG. 5 shows a fifth flash array according to the invention as well as a voltage source for it.

FIG. 5 shows a circuit which is roughly the same as that of FIG. 4. Also here there is a parallel circuit of lamps 46, 47, 48 and 49. It differs from the preceding Figure, however, in that now use is made of combined melting strips. So in FIG. 5 the combined melting strip 60 is a combination of the strips 52 and 51 of the flash array of FIG. 4. In FIG. 5 a combined melting strip 61 is now added to lamp 47. A combined melting strip 62 is added to lamp 48. If the lamp 46 is the first to be ignited in the circuit of FIG. 5, the melting strip 60, which is provided with three terminals, is fused. This results in that in the first place the original circuit across the series circuit 47, 61 is eliminated and in the second place in that the connection from the lamp 46 to the terminal 45 is opened. So the multiple melting contact 60 has the same function as the common melting strips 51 and 52 of FIG. 4. For the rest this circuit is constructed in the same way and operates in the same manner as described sub FIG. 4.

Figure 6:
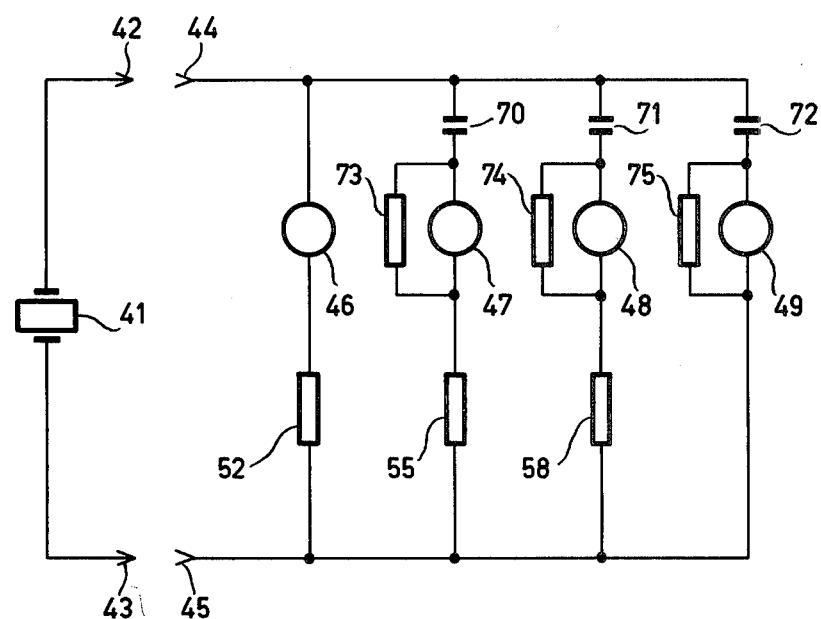
FIG. 6 shows a sixth flash array according to the invention as well as a voltage source for it.

FIG. 6 shows a second variant of FIG. 4. Also here there are four parallel-connected combustion flash lamps 46, 47, 48 and 49. At the same time a melting strip 52 is added to the lamp 46 and is connected in series therewith. Furthermore a melting strip 55 is added to the lamp 47 which is connected in series therewith. A melting strip 58 is added to the lamp 48 and connected in series therewith. However, the capacitors are now no longer included in the series conductors between the parallel branches but in the parallel branches. So lamp 47 is connected to a capacitor 70, the other electrode of which is connected to a series conductor connected to the terminal 44. Also connected to this series conductor there is a capacitor 71 and a capacitor 72. The other electrode of the capacitor 71 is connected to lamp 48. The other side of the capacitor 72 is connected to the lamp 49. The lamp 47 is shunted by a melting strip 73. The lamp 48 is shunted by a melting strip 74. The lamp 49 is shunted by a similar strip 75. The melting strips 73 and 52 fuse when the lamp 46 flashes. The strips 74 and 55 fuse when the lamp 47 flashes. The strips 75 and 58 fuse when the lamp 48 flashes. This means inter alia that the strips 73, 74 and 75 have the same function as the strips 51, 54 and 57 of FIG. 4. The lamps in the embodiment of FIG. 6 are of the same type as designated in the description of FIG. 5. The capacitance value of the capacitor 70 is approximately 7pF, that of capacitor 71 approximately 5pF that of capacitor 72 approximately 5pF. An additional advantage of the circuit of FIG. 6, as compared to that of FIG. 5, is that in the case of FIG. 6 also the last lamp 49 invariably receives an adequate ignition pulse because the only capacitive impedance in the circuit: 44, lamp 49, terminal 45 is formed by the capacitance 72. In the case of FIG. 5 it consists of several capacitances. This means that in the circuit of FIG. 6 the piezo element 41 need not be rated for producing particularly strong high voltage pulses.

In the embodiments described the number of lamps was four. It is evident that for other variants this number may be two or three or more than four.

What is claimed is:

1. A flash array for connection to an associated voltage source which supplies a pulse-shaped voltage which comprises: at least first and second electrical input terminals, first and second combustion flash lamps connected in series to said input terminals, and means for igniting those lamps in predetermined succession, said means including a first fusable strip connected in series with said first lamp, said fusible strip opening upon flashing of said first lamp, said second lamp and said first fusable strip connected in parallel branches, said lamps being high voltage combustion flash lamps and at least after the flashing of said first lamp, said input terminals are interconnected by a series circuit of a mainly capacitive circuit element and said parallel branches.

2. A flash array as claimed in claim 1, wherein said mainly capacitive circuit element comprises said first lamp after flashing.

3. A flash array as claimed in claim 1, wherein said mainly capacitive circuit element comprises a capacitor which shunts a branch circuit comprising said first lamp.

4. A flash array as claimed in claim 3 provided with $n$ high voltage combustion flash lamps where $n$ is larger than 2 and wherein each of at least ($n - 2$) of those lamps is included in a separate series circuit which comprises the fusable strip connected to that lamp and said capacitor, said fusable strip forming a shunt of said series circuit of the next lamp to be flashed and the fusable strip cooperating with the next lamp to be flashed, said capacitor at all times forming a shunt of at least the preceding lamp.

5. A flash array for cooperation with an associated voltage source which supplies a pulse-shaped voltage which comprises: first and second electrical input terminals, for connection to the associated voltage source, first and second combustion flash lamps connected in parallel to said input terminals, means for igniting said bulbs in succession, said means including first fusable strip which opens when said first lamp is flashed, said second lamp and said first fusable strip being connected in parallel branches, said lamps being high voltage combustion flash lamps, said input terminals being connected by means of a series circuit of a mainly capacitive circuit element and said parallel branches which comprise said second lamp and said first fusable strip, said series circuit which comprises both the mainly capacitive circuit element and said second lamp is shunted by a shunting branch which comprises said first lamp.

6. A flash array as claimed in claim 5, wherein said mainly capacitive circuit element consists of a capacitor.

7. A flash array as claimed in claim 6 wherein said shunting branch further comprises a second fusable strip which melts when said first lamp is flashed.

8. A flash array as claimed in claim 7, wherein said first fusable strip melts when said first bulb is flashed, and said second fusable strip and said first fusable strip are a combined-radiation-sensitive melting strip provided with three electrical terminals.

9. A flash array as claimed in claim 7, wherein a series conductor is connected to each of said first and second input terminals, and $n$ high voltage combustion flash lamps are connected in parallel between said series conductors where $n$ is larger than 2 and at least $(n - 2)$ of such lamps are a part of a separate series circuit which is connected between the two series conductors and which, besides that lamp, also comprises an associated capacitor and second fusable strip, a part of that series circuit which comprises the lamp is shunted by said first fusable strip of the preceding lamp.

* * * * *